June 5, 1962 J. GASSMANN 3,037,349
GAS TURBINE INSTALLATION, PARTICULARLY FOR MOTOR VEHICLES
Filed Sept. 26, 1957
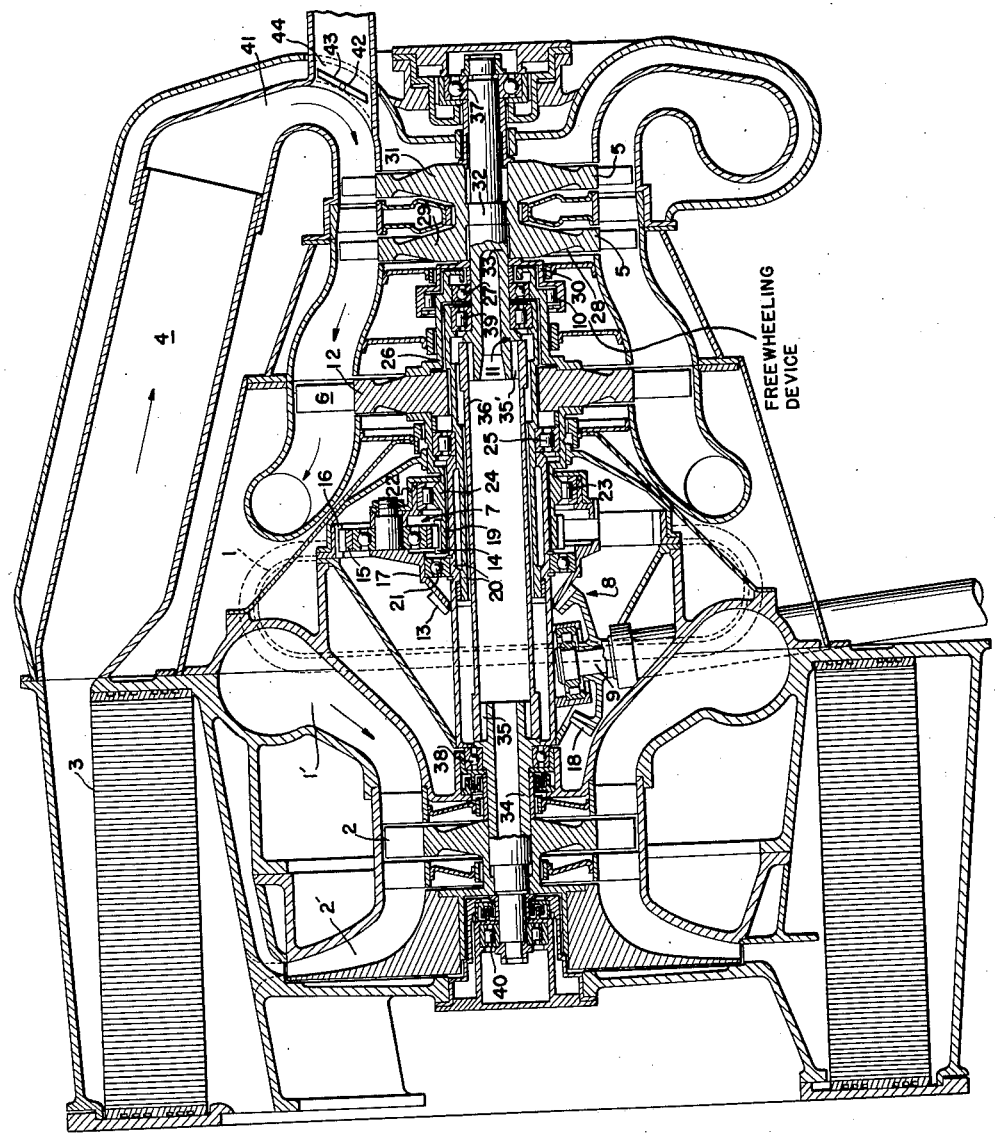
INVENTOR
JOHANNES GASSMANN
BY Dicke and Craig
ATTORNEYS

United States Patent Office 3,037,349
Patented June 5, 1962

3,037,349
GAS TURBINE INSTALLATION, PARTICULARLY FOR MOTOR VEHICLES
Johannes Gassmann, Altbach, near Esslingen (Neckar), Germany, assignor to Daimler-Benz Aktiengesellschaft, Stuttgart-Unterturkheim, Germany
Filed Sept. 26, 1957, Ser. No. 686,534
Claims priority, application Germany Sept. 28, 1956
1 Claim. (Cl. 60—39.16)

The present invention relates to a gas turbine installation, especially for driving motor vehicles, including a compressor, a compressor turbine, an output turbine and a transmission between the output turbine and the driven shaft, and more particularly wherein the output turbine and the transmission leading to the output shaft are arranged between the compressor and the compressor turbine and the shaft connecting the compressor with the compressor turbine extends through the wheel or interconnected wheels of the output turbine and through the transmission.

Those types of gas turbine installations are known in the prior art in which the wheel or wheels of the output turbine are mounted on a hollow shaft and are connected with a driven shaft extending parallel thereto by means of toothed gears and an intermediate shaft also extending approximately parallel thereto. The intermediate shaft is thereby necessary in such prior art installations by reason of the fact that a driven shaft passing the turbine section of the installation must be disposed outside of the outer diameter thereof as determined by the wheels of the turbine. With an annularly shaped combustion chamber directly surrounding the turbine section of the installation, several intermediate shafts would become necessary.

In contrast thereto, the present invention proposes an installation in which the wheel or wheels of the output turbine are connected with the driven shaft disposed essentially perpendicularly to the central longitudinal axis of the installation by means of a planetary gear arranged about or coaxial with the center line and of a pair of bevel gears. Such a driven shaft requires no space within the space surrounding the turbine section of the installation so that the same is readily accessible and the combustion chamber, gas discharge lines and the like may be readily accommodated therein to provide an efficient and compact structure. Furthermore, as compared with the known prior art devices, the intermediate shafts of such installations may be dispensed with altogether.

Accordingly, it is an object of the present invention to provide an arrangement of a gas turbine installation which is extremely compact, simple and appropriate.

It is still another object of the present invention to provide an installation for a gas turbine which requires very little space, particularly for the torque transmitting parts thereof, and which permits an arrangement of the driven shaft essentially perpendicular to the central longitudinal axis of the turbine.

Still another object of the present invention resides in the arrangement of the various parts, particularly of the connecting shafts and torque transmitting shafts in such a manner as to enable fullest utilization of the space disposed about the turbine section.

These and other objects, features and advantages of the present invention will become more obvious from the following description when taken in connection with the accompanying drawing which shows, in the single FIGURE thereof, an axial cross sectional view through one embodiment of the gas turbine in accordance with the present invention.

Referring now to the drawing, the gas turbine installation in accordance with the present invention includes an inlet nipple or connecting member 1, a compressor 2 of conventional construction connected with the inlet connecting member 1 over line 1' and in which the air drawn-in from within the vicinity of the inlet connecting member 1 is compressed. The output of the compressor 2 is connected by a line 2' with the input of a heat exchanger 3 in which the air, compressed in the compressor 2, is pre-heated by the discharge gases of the installation. A combustion chamber 4 of any suitable construction which is connected with the output of the heat exchanger 3 receives the compressed air in which heat is added to the compressed air by injected fuel. The hot combustion gases which leave the combustion chamber 4 through line section 41 give off the energy thereof to the wheels of two turbines 5 and 6. The turbine 5 thereby serves for purposes of driving the compressor 2 and thus constitutes the compressor turbine, while the other turbine 6 delivers the output thereof over a planetary gear 7 and a pair of bevel gears 8 to the driven shaft 9 for purposes of driving a motor vehicle and thereby constitutes the output turbine. Ordinarily, the output turbine 6 is permitted to rotate independently of the compressor turbine 5 by the use of a one-way freewheeling device 10 inserted in the connection therebetween since the rotational speed of the output turbine 6 is less than that of the compressor turbine 5 under normal operating conditions.

In accordance with the present invention, the output turbine 6 and the transmission consisting of planetary gear 7 and bevel gears 8 are disposed between the compressor 2 and the compressor turbine 5. The combustion chamber 4 is disposed essentially parallel to the shaft 11 connecting the compressor 2 with the compressor turbine 5 and above the turbine section constituted by the compressor turbine 5 and the output turbine 6. The heat exchanger 3 of the installation surrounds the compressor 2 essentially annularly.

The shaft connecting the compressor 2 with the compressor turbine 5 and generally designated by reference numeral 11 extends through the turbine wheel of the output turbine 6 as well as through the planetary gear 7 and bevel gear 13 of the pair of bevel gears generally designated by reference numeral 8. The planetary gear 7 includes a sun gear 14, a plurality, for example, three planet gears 15 of which only one is shown, and a stationary outer or ring gear 16 whereby the planet gears 15 are connected with the bevel gear 13 by means of an annularly-shaped hub-and-flange member 17. The other bevel gear 18 of the pair of bevel gears 8 is in meshing engagement with the bevel gear 13 and the bevel gear 18 is securely mounted on the driven shaft 9 which extends approximately perpendicularly to the shaft 11 connecting the compressor 2 with the compressor turbine 5. The sun gear 14 is connected with the turbine wheel 12 of the working turbine 6 over a hollow shaft 19.

The shaft 11 connecting the compressor 2 with the compressor turbine 5 is surrounded by a stationary double sleeve 20 which in turn extends through the turbine wheel 12 of the output turbine 6 and through the planetary gear 7.

The hub-and-flange member 17 is supported on sleeve 20 by means of a ball bearing 21. Furthermore, the hub-and-flange member 17 is mounted by means of a flange 22 over a roller bearing 23 on the hollow shaft 19 connecting the sun gear 14 with the turbine wheel 12 of the output turbine 6 whereby the hollow shaft 19 simultaneously forms the inner race 24 of the roller bearing 23.

The turbine wheel 12 of the output turbine 6 is supported, on the one hand, over hollow shaft 19 by means of a roller bearing 25 on the stationary sleeve 20 and, on the other, over a further oppositely directed hollow shaft 26 by means of roller bearings 27 directly on the shaft 11 connecting the compressor 2 and compressor turbine 5.

The hollow shafts 19 and 26 are thereby suitably secured to the turbine wheel 12 of the output turbine 6.

The hollow shaft 26 is connected at the outer periphery thereof over freewheeling device 10 with an annularly-shaped flange 30 secured to the turbine wheel 29 of the compressor turbine 5 at the side 28 thereof facing the output turbine 6 and therewith establishes a one-way overrunning connection between the turbine wheel 12 of output turbine 6 and the unitary turbine wheels 29 and 31 of the compressor turbine 5. The turbine wheels 29 and 31 of the compressor turbine 5 are secured on a polygonal section 32 of the shaft generally designated by reference numeral 11 and connecting the compressor turbine 5 with the compressor 2.

The shaft 11 is actually constructed in three sections 33, 34 and 36, whereby one outer shaft section 33 extends essentially over the length of the compressor turbine 5 and the other outer shaft section 34 essentially over the length of the compressor 2. The two outer shaft sections 34 and 33 are connected with the center shaft part 36 in any suitable manner, for example, by toothed connections 35 and 35', respectively, splined connections or the like. The support of outer shaft sections 33 and 34 takes place in a conventional manner by means of two ball bearings 37 and 38 and two roller bearings 39 and 40, respectively, whereby the shaft section 33 extending essentially over the length of the compressor turbine 5 is supported with the inner roller bearing 39 thereof in the stationary sleeve 20.

Furthermore, a line section 44 is provided which discharges into the atmosphere at the outer free end thereof and which is connected at the inner end thereof to the supply line 41 supplying the combustion gases from the combustion chamber 4 to the compressor turbine 5. An adjustable closure member 43 such as a valve, is arranged within the line 44 so as to adjustably open or close the same. The valve member 43 is connected in any suitable manner at the rotatable supporting shaft 42 thereof with the actuating link system of the brake of the motor vehicle, for example, by a suitable mechanical linkage (not shown) operatively connecting actuating shaft 42 of valve member 43 with the brake actuating member, for instance the brake pedal, of the motor vehicle. It is understood that the valve member 43 may thereby be actuated mechanically, hydraulically or electrically in any suitable manner by the actuating member for the brake system of the motor vehicle.

If the motor vehicle is to be braked, then two steps have to be taken, namely (1) The supply of fuel to the combustion chamber 4 has to be interrupted, which may be accomplished in any suitable manner by a fuel control device suitably connected with brake actuating mechanism, and (2) The line 44 which leads into atmosphere has to be opened by means of valve 43.

Since gases containing energy are thereby no longer supplied to the compressor turbine 5, the rotational speed of the turbine wheels 29 and 31 thereof will rapidly decrease and will thereby attain the rotational speed of the turbine wheel 12 of the output turbine 6 which is now kept in rotation by the driving vehicle and the rotational speed of which does not decrease equally rapidly. As soon as speed equality between turbines 5 and 6 is reached, the freewheeling device 10 locks and all the turbine wheels of the turbines 5 and 6 as well as of the compressor 2 are thereby connected together over freewheeling device 10 for synchronous operation as also more fully described in my co-pending application, filed September 26, 1957, Serial No. 686,471 entitled "Gas Turbine Arrangement."

The energy of the vehicle is now dissipated by the work done by the compressor 2. Additionally, the turbine wheels 29 and 31 and the turbine wheel 12 of the compressor turbine 5 and of the output turbine 6, respectively, now driven by the vehicle, become effective as pump wheels and attempt to suck-in or draw-in a portion of the air issuing from the compressor which now has become pressureless by opening discharge line 44 leading to the atmosphere so that the turbine wheels 29 and 31 as well as turbine wheel 12 of compressor turbine 5 and output turbine 6, respectively, increase the amount of energy which has to be produced by the driving vehicle and thereby effectively increase the braking effect on the vehicle.

The control arrangement for bringing about the braking effect described hereinabove may be of any suitable type, for example, automatic, as more fully described in my aforementioned copending application.

While I have shown and described one specific embodiment in accordance with the present invention, it is understood that the same is susceptible of many changes and modifications within the spirit of the present invention, for instance, the discharge line 44 may be connected between compressor 2 and combustion chamber 4 instead, and I intend to cover all such changes and modifications as encompassed by the appended claim.

I claim:

A gas turbine installation having a longitudinal axis and output means disposed approximately perpendicularly to said axis comprising compressor means, turbine means including a compressor turbine and an output turbine, combustion chamber means disposed exteriorly of said turbine means and at least partially surrounding said turbine means, conduit means connecting said compressor means with said combustion chamber means and said combustion chamber means with said turbine means, gear means operatively connecting said output turbine with said output means, said output turbine and said gear means being located between said compressor means and said compressor turbine, said gear means including bevel gear means and a planetary gear coaxial with said longitudinal axis, shaft means extending through said output turbine and said planetary gear to connect said compressor turbine with said compressor means, said planetary gear including a sun gear, a stationary ring gear and a plurality of planet gears in meshing engagement with said sun gear and with said ring gear, hollow shaft means connecting said sun gear with said output turbine, connecting means connecting said planet gears with said bevel gear means, stationary double sleeve means intermediate said shaft means and said hollow shaft means, bearing means for supporting said hollow shaft means at one end thereof upon said stationary sleeve means, bearing means for journaling one end of said connecting means on said stationary sleeve means, and one-way engaging means connecting said compressor turbine with said output turbine, said compressor turbine, said output turbine and said one-way engaging means being coaxial with said longitudinal axis.

References Cited in the file of this patent

UNITED STATES PATENTS

| | | |
|---|---|---|
| 2,439,803 | Giesen | Apr. 20, 1948 |
| 2,614,385 | Feilden | Oct. 21, 1952 |
| 2,619,797 | Haworth | Dec. 2, 1952 |
| 2,631,427 | Rainbow | Mar. 17, 1953 |
| 2,747,367 | Savin | May 29, 1956 |
| 2,803,943 | Rainbow | Aug. 27, 1957 |
| 2,895,295 | Carlson | July 21, 1959 |
| 2,960,825 | Sampietro et al. | Nov. 22, 1960 |

FOREIGN PATENTS

| | | |
|---|---|---|
| 840,938 | Germany | June 9, 1952 |